United States Patent [19]

Hopkins et al.

[11] Patent Number: 4,898,270

[45] Date of Patent: Feb. 6, 1990

[54] APPARATUS FOR ALIGNING AND TRANSPORTING CONTAINERS

[75] Inventors: Larry K. Hopkins, Lakewood; Gregory J. Fischer; David G. Green, both of Wheatridge, all of Colo.

[73] Assignee: Golden Aluminum Company, Lakewood, Colo.

[21] Appl. No.: 98,479

[22] Filed: Sep. 18, 1987

[51] Int. Cl.⁴ ............................................. B65G 47/24
[52] U.S. Cl. ................................... 198/396; 198/390; 198/416; 198/445
[58] Field of Search ............... 198/389, 390, 393, 396, 198/397, 408, 415, 443, 445, 455, 456, 622, 690.2, 382, 435, 446, 526, 533, 534, 540, 547, 550.01, 550.13, 383, 385, 387, 400; 193/7, 14, 44–48

[56] References Cited

U.S. PATENT DOCUMENTS

| | | |
|---|---|---|
| 1,972,488 | 9/1934 | Kimball et al. . |
| 2,186,652 | 1/1940 | Orth et al. . |
| 2,192,518 | 3/1940 | Eissmann ............................ 198/445 |
| 2,651,412 | 9/1953 | Aller . |
| 2,684,147 | 7/1954 | Holstebro . |
| 2,714,832 | 8/1955 | Seed et al. . |
| 2,781,885 | 2/1957 | Taylor ................................. 198/389 |
| 2,791,330 | 5/1957 | Carlson . |
| 2,910,165 | 10/1959 | Byington ............................. 198/397 |
| 3,135,385 | 6/1964 | Cwycyshyn et al. . |
| 3,367,534 | 2/1968 | Carter . |
| 3,420,354 | 1/1969 | Gardiner . |
| 3,690,437 | 9/1972 | Kammann ....................... 198/400 X |
| 3,776,346 | 12/1973 | Dubuit ................................ 198/396 |
| 3,835,985 | 9/1974 | Johnson .............................. 198/397 |
| 3,895,982 | 7/1975 | Persson ........................ 198/690.2 X |
| 4,235,187 | 11/1980 | Mirza ............................ 198/690.2 X |
| 4,248,389 | 2/1981 | Thompson et al. . |
| 4,376,481 | 3/1983 | Franklin . |
| 4,494,919 | 1/1985 | Knudson et al. ............... 198/382 X |
| 4,549,662 | 10/1985 | Schoenig et al. . |
| 4,623,058 | 11/1986 | Bossler .............................. 198/382 |

FOREIGN PATENT DOCUMENTS 0117402 9/1984 European Pat. Off. .

Primary Examiner—Robert J. Spar
Assistant Examiner—Lyle Kimms
Attorney, Agent, or Firm—Sheridan, Ross & McIntosh

[57] ABSTRACT

An improved apparatus for aligning and transporting containers is disclosed. The apparatus includes a hopper having dividers with the dividers having top surfaces which decline from one end wall of the hopper at different angles. A conveyor is provided and positioned underneath at least a portion of the hopper for transporting containers aligned by the hopper. The containers are transported along the conveyor toward a movable deflector means for deflecting any containers which are not properly aligned. Containers which are in proper alignment pass underneath and drop away from the deflector means in uniform alignment and are further processed by a detecting or scanning device.

19 Claims, 2 Drawing Sheets

APPARATUS FOR ALIGNING AND TRANSPORTING CONTAINERS

FIELD OF THE INVENTION

This invention relates to an apparatus for aligning containers in a uniform orientation within a container handling system. More particularly, the present invention is used for aligning containers in a uniform end-to-end manner.

BACKGROUND OF THE INVENTION

Several states have enacted mandatory deposit legislation for beverage containers. Such laws necessitate the handling of large numbers of cans and other containers for determining the deposit due to customers and to invoice distributors for deposit returns to customers by retailers. In some states where such laws have not been passed, material cost and conservation considerations have prompted private efforts in the recycling of containers which also requires the handling of many containers. This handling can be time consuming and cumbersome to do by hand. Consequently, automated methods for handling containers have been developed. Such methods generally require that the containers be positioned in a uniform alignment for standardized scanning or counting.

For example, in U.S. Pat. No. 1,972,488 to Kimball, et al., a can arranging device has a number of rods placed over a conveyor belt to form lanes for orienting cans. In the event that cans which are fed to the apparatus do not fall into lanes, but rather straddle more than one lane, Kimball, et al. further provide for diamond shaped buttons placed on top of the lane dividing rods for displacing a can from a straddling position as the can strikes one of the buttons. In the event that a can becomes placed in a lane in an upright position rather than a horizontal position, Kimball, et al. provide a stationary deflector plate for turning cans to a horizontal position as they are transported underneath the plate by the conveyor belt.

Franklin, U.S. Pat. No. 4,376,481, describes a similar device for arranging a random supply of articles. The apparatus in Franklin includes a number of blades which are substantially parallel to each other and which vertically reciprocate. Articles are fed into a space over these blades and oriented between the blades in a uniform arrangement by the coordinated reciprocating motion of the blades.

U.S. Pat. No. 2,186,652 to Orth, et al., discloses a vibratory aligner. The device in Orth includes an angled, vibrating table with longitudinal ribs for creating lanes through which articles to be aligned are transported. The Orth device further includes lugs placed on top of the ribs for deflecting articles into alignment as they move down the table and hit the lugs.

U.S. Pat. No. 2,714,832 to Seed, et al. describes an article sorting and delivery machine. Cylindrical cartridges are placed in a hopper having alternately vertically reciprocating slats for feeding cartridges through the bottom of the hopper to a gravity chute having ridges which define lanes. Pegs are placed on the ridges to turn cartridges which are not aligned within the lanes as they strike the pegs. Additionally, the apparatus has triangular pieces near the end of the lanes on top of the ridges for carrying any non-aligned cartridges straddling a lane up from the top of the ridges onto an apron, while aligned cartridges in the lanes drop beneath the apron.

A container orienting apparatus is also disclosed in Gardiner, U.S. Pat. No. 3,420,354. The Gardiner apparatus feeds cans onto a moving conveyor with the longitudinal axes of the cans transverse to the direction of motion. One end of the can is blocked by a dead-plate while the other end contacts a rapidly moving rubber belt having a grooved surface for gripping cans.

Holstebro, U.S. Pat. No. 2,684,147 describes a can unscrambling machine. This apparatus shows the use of guide bars over a conveyor to form lanes for separating cans.

Although the patents discussed above show numerous automated container aligning devices, there is a further need for an aligning device which simply and efficiently orients containers in an end-to-end manner. There is an additional need for an aligning device having a means for correcting the orientation of nonaligned containers in a manner that substantially precludes jamming of the apparatus by the containers and minimizes the risk of damage to the containers as they are aligned and transported.

SUMMARY OF THE INVENTION

In accordance with the present invention, an improved apparatus for aligning and transporting containers is disclosed. The apparatus includes a novel hopper for receiving containers. The hopper has parallel stationary dividers for aligning and orienting containers in an end-to-end fashion about the longitudinal axes of the containers. The dividers have top surfaces which lie in substantially parallel vertical planes and which decline from an upper position on an outer end wall of the hopper towards the other end of the hopper. Consequently, as containers contact and pass over the declining top surfaces of the dividers, the containers are gravitationally aligned between the dividers in separate lanes. It is preferable to have the dividers spaced so that lanes are formed which are wider than the width of the containers. It is also preferable that the lanes are wider than one-half the length of the containers to prevent a container from straddling two lanes.

A conveyor is positioned under at least part of the hopper for transporting containers and has lane dividers oriented in a fashion corresponding with the hopper dividers for maintaining the aligned orientation of the containers. The containers are forwardly transported by the conveyor and pass under a rotating deflector which is spaced over the conveyor at a distance sufficient to allow aligned containers lying flat on the conveyor to pass under the deflector. The deflector imparts a backward motion to any container standing on end or leaning on an aligned container away from the direction of movement of the conveyor. In this manner, containers are substantially prevented from becoming jammed underneath the deflector. A detector can be alternately provided for counting or scanning aligned containers after they pass under the deflector means.

DETAILED DESCRIPTION

Figure 1:
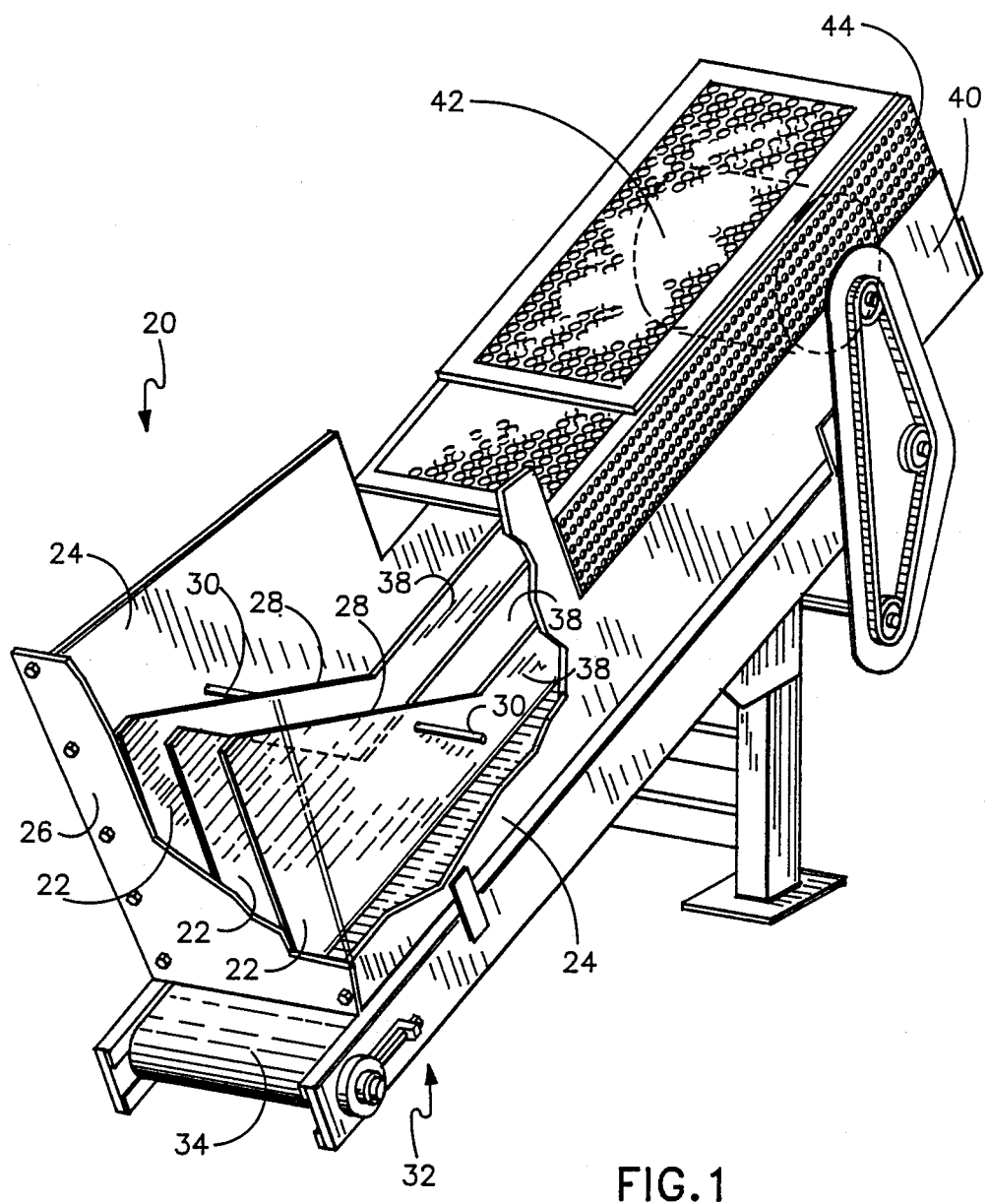
FIG. 1 is a perspective partially cut-away view of the preferred embodiment of the aligning and transporting apparatus of the present invention.

In accordance with the preferred embodiment of the invention, FIG. 1 shows a top partially cut-away perspective view of the apparatus, including the hopper 20. Three dividers 22 are provided within the hopper 20 for aligning containers as containers are fed into the hopper 20 and contact the dividers 22. Also shown are hopper sidewalls 24 and a hopper end wall 26. As seen in FIG. 1, the dividers 22 are positioned in substantially parallel vertical planes and have top surfaces 28. Cross bars 30 connect each side wall with the adjacent divider 22.

The top surfaces 28 of the dividers 22 are attached to the hopper 20 near the top of the hopper end wall 26. The top surfaces 28 of adjacent dividers 22 decline from the hopper end wall 26 at varying angles and continue toward the bottom of the hopper 20. The three dividers 22 and two hopper sidewalls 24 form four lanes in the hopper for aligning containers.

Figure 4:
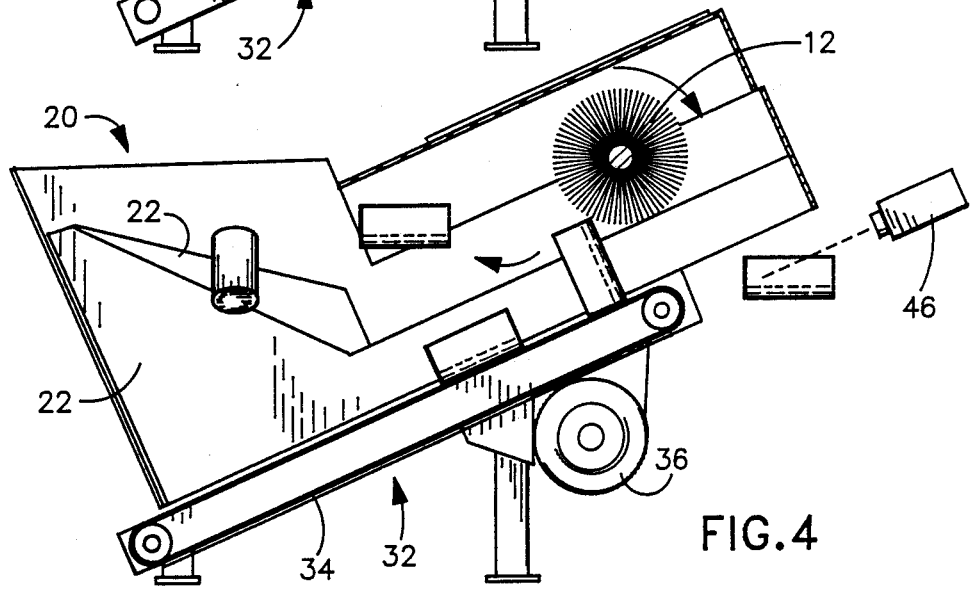
FIG. 4 is a sectional side view of the preferred embodiment of the present invention.

In operation, containers are fed into the top of the hopper 20, preferably near the hopper end wall 26. As containers fall into the hopper 20, some containers will be positioned substantially in alignment with a lane and will simply fall into that particular lane. Containers which straddle more than one lane may contact one or two of the dividers 22. If a container contacts only one of the dividers 22, it will fall to one side or the other of the divider 22 into one of the two lanes adjacent to the divider 22. If a container contacts two adjacent dividers 22, it will begin to move downward into the bottom of the hopper 20 supported by the two dividers 22, as illustrated in FIG. 4. Any two adjacent dividers 22 have different angles of declination from the hopper end wall 26. As a container supported by two adjacent dividers 22 begins to descend into the hopper 20, one portion of the container descends more quickly than the other because the top surfaces 28 of the dividers 22 decline at different angles. As the container continues down the dividers 22 with one end of the container descending more quickly, it eventually reaches a position such that the two dividers 22 can no longer support the container on the top surfaces 28 of the dividers 22. At this point, the container becomes unbalanced and falls into a lane formed by the dividers 22.

It is contemplated that a hopper 20 in accordance with the present invention can have two or more dividers 22 for aligning containers. It is important for the present invention that any two adjacent dividers 22 decline from the hopper end wall 26 at different angles so that a container being supported by the two adjacent dividers 22 becomes unstable on the top surfaces 28 of the dividers 22 and drops into a lane as the container travels down the top surfaces 28.

As can be appreciated, the spacing between adjacent dividers 22 and between dividers 22 and sidewalls 24 is dependent upon the geometry of containers handled by the apparatus. Any two adjacent dividers 22 or a divider 22 and an adjacent sidewall 24 should be spaced apart a distance which is greater than the width of the containers which are handled by the present apparatus. In this manner, lanes are formed which are wide enough for aligned containers to fall through the hopper 20 to a conveyor 32 underneath the hopper 20. Preferably, adjacent dividers 22 and sidewalls 24 are spaced so that the lanes formed thereby are wider than the width of containers handled by the apparatus, but not substantially greater than that width. It will be appreciated that as a lane formed by adjacent dividers 22 or by a divider 22 and an adjacent sidewall 24 becomes substantially wider than the width of the container, the alignment becomes less effective because a container can be positioned in a wider range of orientations with respect to the longitudinal axis of the lane.

Lanes formed by adjacent dividers 22 or by a divider 22 and a sidewall 24 are also preferably of a width that is greater than one-half the length of containers handled by the apparatus. In this manner, a container can contact, at most, two dividers 22 or one divider 22 and a sidewall 24. In this embodiment, each pair of adjacent dividers 22 or adjacent divider 22 and sidewall 24 must have top surfaces declining from the hopper end wall 26 at different angles. However, if the hopper lanes are less than one-half the length of the containers, a container can completely straddle two lanes and be supported by two dividers 22 or a divider 22 and a sidewall 24 having a third divider 22 between them. In this event, it is necessary that each divider 22 and sidewall 24 decline from the hopper end wall 26 at an angle different from each adjacent divider 22 or sidewall 24, as well as from each divider 22 or sidewall 24 which is next to an adjacent divider 22.

Figure 3:
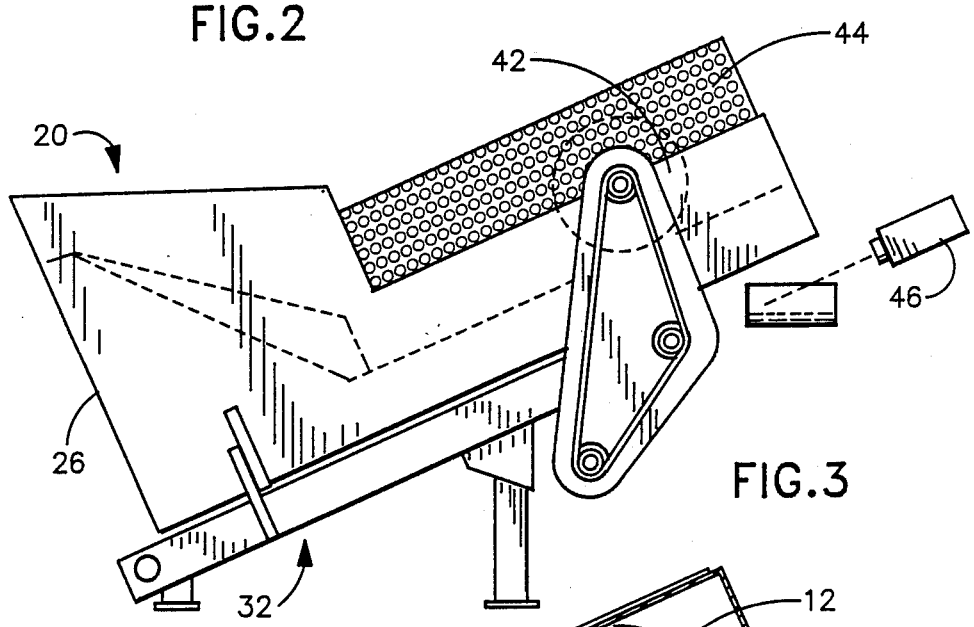
FIG. 3 is a full side view of the preferred embodiment of the present invention.

As seen most clearly in FIG. 3, the hopper end wall 26 is sloped in the direction of the conveyor 32. As containers are fed into the hopper 20, some containers are positioned substantially in alignment with a lane and fall between two adjacent dividers 22. Such containers may strike the sloped end wall 26 and slide down the end wall 26 to the conveyor 32. In this manner, containers strike the conveyor 32 more gently than if the hopper end wall 26 were vertical.

Also depicted in FIG. 1 are cross bars 30. The cross bars 30 in FIG. 1 are cylindrical bars connecting each hopper sidewall 24 with the adjacent divider 22. The cross bars 30 are substantially horizontal and are positioned substantially transverse to the lanes formed by the dividers 22. The dividers 22 and sidewalls 24 are stabilized by the cross bars 30.

The hopper design of the present invention provides advantages over known hopper and other aligning device designs. Alignment of containers is achieved by a hopper design allowing gravity to act on containers to direct containers into lanes formed by hopper dividers 22. The spacing between dividers 22 in the hopper 20 and the angulation of the divider top surfaces 28 provides for reliable alignment of containers in a small area. This design is simple and requires no moving parts for alignment as are shown in known references.

Figure 2:
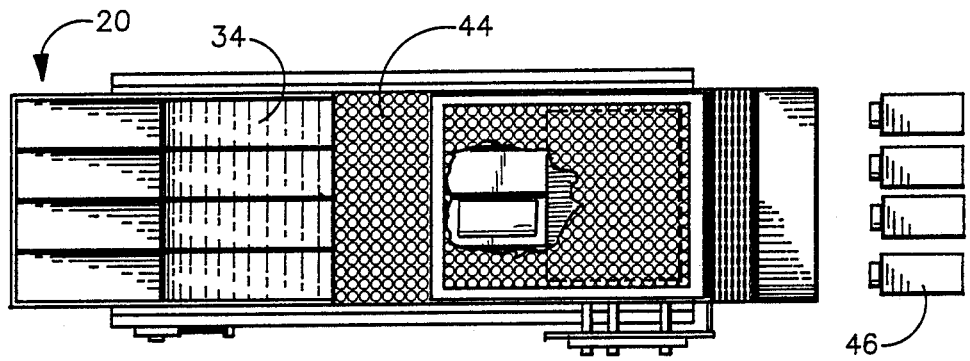
FIG. 2 shows a top partially cut-away view of the apparatus of the present invention.

As seen in FIG. 1, the bottom portion of the hopper 20 opens onto the conveyor 32. As depicted in FIGS. 1 and 2, the conveyor 32 passes under the entire open bottom portion of the hopper 20. The conveyor 32 includes a conveyor belt 34 driven by a motor 36 in a rotating manner. The direction of rotation of the conveyor belt 34 is such that articles received on the conveyor belt 34 from the hopper 20 are carried away from the hopper along the inclining conveyor 32.

As containers are aligned and separated by the hopper 20, they eventually fall through the hopper 20 and contact the conveyor belt 34. All containers which reach the conveyor belt 34 are positioned in a lane such that the longitudinal axis of the container lies in a plane which is between and preferably substantially parallel to the two dividers 22 forming the lane. Such containers can be lying flat on the conveyor belt 34, standing upright, or leaning on adjacent containers.

It is contemplated that means other than a conveyor belt 34 are suitable for the present invention. For example, containers could be driven along the conveyor 32 by a series of rollers rotating in the desired direction of transport or a gravity chute could transport containers along the conveyor 32.

The conveyor belt 34 of the present invention can have ridges for increasing friction between the conveyor belt 34 and containers. The use of ridges on a conveying surface is a conventionally recognized means to increase friction between the conveying surface and an article placed thereon. In this manner, containers are less likely to slide over the belt as they are transported up the inclined conveyor 32. Relatedly, the angle of inclination of the conveyor 32 can be increased to minimize space requirements. Other types of conveyor belts having various textures for improved friction between containers and the conveyor belt are also suitable for the present invention.

As seen in FIG. 4, the conveyor belt 34 can be driven by an electric motor 36 and a drive chain assembly. Other mechanisms for driving the conveyor belt 34 are suitable in the present invention. For example, a belt assembly or a gear assembly can be used.

After containers are aligned by the hopper 20 and positioned into lanes, they are transported along the conveyor 32. As seen in FIG. 1, the conveyor 32 has rails 38 for defining lanes along the conveyor 32 to maintain the alignment of containers as they are transported from the hopper 20. The rails 38 are integral with the dividers 22 to form continuous lanes to keep containers in alignment. The conveyor 32 also includes sidewalls 40 for further defining lanes on the conveyor 32. Conveyor sidewalls 40 can be attached to hopper sidewalls 24 for maintaining alignment of containers as they exit the hopper 20 and for stability reasons. The lane rails 38 and conveyor sidewalls 40 of the conveyor 32 preferably extend above the conveyor 32 a distance at least equal to one-half the width of containers handled by the apparatus. In this manner, cylindrical containers are prevented from moving off center in a lane and extending over the top of a rail 38.

Containers are transported along the conveyor 32 toward a deflector brush 42, as depicted in FIG. 4. The deflector brush 42 is positioned over the conveyor 32 at a distance at least equal to the width of containers handled by the apparatus. The deflector brush 42 is substantially cylindrical having an axis of rotation substantially perpendicular to the direction of transport of the containers. As containers approach the deflector brush 42, the brush rotates upwardly with respect to the containers. The conveyor belt 34, as depicted in FIG. 4, passes partially under the deflector brush 42. The center line of the brush 42 is approximately aligned with the end of the belt 34.

As containers approach the deflector brush 42 on the conveyor 32, containers which are positioned lying flat on their sides are transported underneath and fall away from the deflector brush 42 without contacting the brush 40. Containers which are standing on end or which are leaning on adjacent containers extend above the conveyor 32 a distance greater than the width of the container and are struck by the brush 42. As the rotating brush 42 strikes an upright or leaning container, a force is imparted to the container upward and away from the direction of travel of the conveyor 32. This action forces the containers to fall back and down the inclined conveyor 32 as illustrated in FIG. 4. Such containers eventually come to rest with respect to the conveyor belt 34 in a different orientation and are again transported toward the deflector brush 42. If the new orientation of the container is such that it lies flat on the conveyor 32, the container will pass under the deflector 42, however, if the new orientation is upright or leaning on another container, it will be struck again by the deflector brush 42 and travel down the conveyor to be re-oriented another time.

While a rotating brush is depicted in FIGS. 2, 3 and 4, it is contemplated that other means for deflecting containers can be used. For example, a rotating cylindrical drum can be used in place of the brush depicted in the drawings.

A retaining cage 44 is provided for retaining containers deflected by the deflector brush 42. As the deflector brush 42 rotates and strikes upright containers, the force imparted by the brush 42 has an upward component and may cause containers to be lifted off of the conveyor belt. The retaining cage 44 prevents containers from being thrown from the apparatus. The retaining cage 44 is attached to the conveyor sidewalls 40 and encloses a portion of the conveyor 32 and the deflector brush 42. Sufficient room is left between the brush 42 and the cage 44 for free rotation of the brush 42. In addition to retaining containers which are deflected by the deflector brush 42, the cage 44 prevents injuries from people contacting the rotating brush 42.

The motor 36 can be utilized to drive the rotation of the deflector brush 42. It is also contemplated that a separate mechanism can be used for operating the brush 42 and the conveyor 32.

As containers are transported along the conveyor 32 toward the deflector brush 42, containers which are positioned on their sides on the conveyor 32 are transported underneath the rotating brush 42 for further processing. Containers which are aligned and transported from the present apparatus in this manner can be easily processed by mechanical means because they are in uniform alignment. For example, the present apparatus can be used for aligning containers for punching, post-forming, filling, or other production related operations. Also, as shown in FIG. 2, scanners 46 can be provided for counting containers as they drop from the conveyor 32 after passing under the rotating brush 42. Such scanners 46 can be of any type known in the art.

The container aligner and feeder of the present invention can also be used with a scanning device such as that disclosed in the commonly owned patent U.S. Pat. No. 4,707,251, for a container scanning and accounting device. The invention disclosed in U.S. Pat. No. 4,707,251 handles uniformly oriented containers and imparts a rotation about the longitudinal axes of containers for scanning of UPC bar codes from the containers as they rotate.

In view of the foregoing, numerous advantages of the present invention should be apparent. A hopper design is provided which aligns and orients containers fed into the hopper without the use of reciprocating orienting devices shown in the known references which require that containers strike the devices to impart movement or change the orientation of the container. Rather, the hopper design in the present invention realigns containers by the use of dividers having top surfaces declining from a hopper end wall at different angles. In this manner, containers become re-aligned by becoming unbalanced as the top surfaces of dividers on which the container is resting diverge. The use of this hopper avoids the infliction of damage to containers by deformation or scratching from orienting devices protruding above dividers. Further, the present hopper is relatively simple and requires no moving parts or complicated apparatus. These features allow for a wide applicability of the hopper because it is inexpensive and compact.

The movable deflector of the present invention provides numerous advantages over the known references. By imparting an active force to non-aligned containers, the deflector propels containers clear of the deflector. In this manner, a container is less likely to become jammed underneath the deflecting means because it is realigned on the conveyor away from the deflector apparatus. The use of a brush as a deflector minimizes container damage to allow for successful scanning and reduces noise caused by the deflector striking containers which is advantageous for use of the apparatus in a retail setting.

The salient features of the present invention are readily apparent from the above detailed description. The disclosed apparatus provides a hopper having substantially vertical stationary dividers having top surfaces declining from the hopper end wall at different angles of declination. The dividers are preferably spaced apart a distance which is greater than the width of the containers and which is greater than one-half of the length of the containers. The apparatus further provides a conveyor means positioned under the hopper for transporting containers aligned by the hopper. Containers are transported by the conveyor toward a movable deflector apparatus. The deflector strikes non-aligned containers to impart a motion away from the direction of transport of the conveyor to such containers. The deflector is spaced over the conveyor a distance such that aligned containers lying on their sides pass underneath the deflector means without contact.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. An apparatus for aligning and transporting containers, comprising:
   (a) a hopper, said hopper having at least two substantially parallel stationary dividers forming hopper lanes for aligning containers about their longitudinal axes, said dividers having top surfaces, said top surfaces lying in substantially parallel vertical planes and declining from an end wall of said hopper, wherein each top surface has an angle of declination different from that of each adjacent top surface;
   (b) conveyor means positioned under at least a portion of said dividers for transporting said aligned containers in a first direction to a first conveyor means end;
   (c) movable deflector means spaced a first distance over said inclined conveyor means, said first distance equal to at least the width of said containers for deflecting any of said containers having at least a portion extending above said inclined conveyor means by more than said first distance, wherein said deflected containers are deflected down said inclined conveyor means; and
   (d) wherein the center of said movable deflector means is approximately aligned with said first conveyor means end so that misaligned containers contacted and supported by adjacent leading aligned containers having a portion extending above said inclined conveyor means by slightly more than said first distance can be aligned as said aligned containers drop from said first conveyor means end prior to deflection of said misaligned containers by said movable deflector means.

2. An apparatus, as claimed in claim 1, wherein said end wall of said hopper is sloped toward said conveyor means.

3. An apparatus, as claimed in claim 1, wherein said conveyor means inclines in said first direction.

4. An apparatus, as claimed in claim 1, wherein said conveyor means includes a rotating conveyor belt.

5. An apparatus, as claimed in claim 4, wherein said conveyor belt has ridges.

6. An apparatus, as claimed in claim 1, wherein said containers are of a substantially uniform width, and wherein said hopper lanes are wider than said width of said containers.

7. An apparatus, as claimed in claim 1, wherein said containers are of a substantially uniform length, and wherein said hopper lanes are wider than one-half said length of said containers.

8. An apparatus, as claimed in claim 1, further comprising sensing means for sensing said containers after said containers are transported by said conveyor means.

9. An apparatus, as claimed in claim 8, wherein after said containers are transported by said conveyor means, said containers fall from said conveyor means.

10. An apparatus, as claimed in claim 8, wherein said sensing means comprises counting means for counting and recording the number of containers handled by said apparatus.

11. An apparatus, as claimed in claim 8, wherein said containers have UPC bar codes and said sensing means comprises scanning means for scanning said UPC codes.

12. An apparatus, as claimed in claim 1, wherein said conveyor means comprises a continuous conveying surface.

13. An apparatus for aligning and transporting containers, wherein said containers have a substantially uniform width, comprising:
   (a) aligning means having at least two substantially parallel stationary dividers for aligning containers about their longitudinal axes;
   (b) conveyor means adjoining at least a portion of said aligning means and inclining from said aligning means for transporting said aligned containers in a first direction to a first conveyor means end;
   (c) movable deflector means spaced a first distance over said inclined conveyor means, said first distance equal to at least the width of said containers for deflecting any of said containers having at least a portion extending above said inclined conveyor means by more than said first distance, wherein said deflected containers are deflected down said inclined conveyor means; and
   (d) wherein the center of said movable deflector means is approximately aligned with said first conveyor means end so that misaligned containers contacted and supported by adjacent leading aligned containers having a portion extending above said inclined conveyor means by slightly more than said first distance can be aligned as said aligned containers drop from said first conveyor means end prior to deflection of said misaligned containers by said movable deflector means.

14. An apparatus, as claimed in claim 13, wherein said movable deflector means rotates.

15. An apparatus, as claimed in claim 14, wherein said deflector means rotates about an axis substantially perpendicular to said first direction.

16. An apparatus, as claimed in claim 13, wherein said deflector means deflects any of said containers having at least a position extending above said conveyor means by more than said first distance in a direction at least partially away from said first direction.

17. An apparatus, as claimed in claim 14, wherein said deflector means comprises a brush.

18. An apparatus, as claimed in claim 13, further comprising retaining means positioned over at least a portion of said deflector means and over at least a portion of said conveyor means, for retaining any of said containers deflected by said deflector means.

19. An apparatus, as claimed in claim 18, wherein said retaining means is a cage.

* * * * *

UNITED STATES PATENT AND TRADEMARK OFFICE
CERTIFICATE OF CORRECTION

PATENT NO. : 4,898,270
DATED : February 6, 1990
INVENTOR(S) : Hopkins, et al.

It is certified that error appears in the above—identified patent and that said Letters Patent is hereby corrected as shown below:

At column 8, line 35, after "said containers fall from said conveyor means" insert --,and wherein said sensing means senses said containers as said containers fall from said conveyor means --.

Signed and Sealed this

Twenty-eighth Day of May, 1991

*Attest:*

HARRY F. MANBECK, JR.

*Attesting Officer*   *Commissioner of Patents and Trademarks*